(12) United States Patent
Efremov et al.

(10) Patent No.: US 9,210,439 B2
(45) Date of Patent: *Dec. 8, 2015

(54) HIGH DYNAMIC RANGE CODECS

(71) Applicant: MAX-PLANCK-GESELLSCHAFT ZUR FORDERUNG DER WISSENSCHAFTEN E.V., Munich (DE)

(72) Inventors: Alexander Efremov, Viluchinsk (RU); Rafal Mantiuk, Saarbrucken (DE); Grzegorz Krawczyk, Saarbrucken (DE); Karol Myszkowski, Saarbrucken (DE); Hans-Peter Seidel, St. Ingbert (DE)

(73) Assignee: MAX-PLANCK GESELLSCHAFT ZUR FORDERUNG DER WISSENSCHAFTEN E.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/617,445

(22) Filed: Feb. 9, 2015

(65) Prior Publication Data

US 2015/0156506 A1 Jun. 4, 2015

Related U.S. Application Data

(63) Continuation of application No. 14/076,000, filed on Nov. 8, 2013, now Pat. No. 8,989,267, which is a continuation of application No. 13/961,266, filed on Aug. 7, 2013, now Pat. No. 8,611,421, which is a (Continued)

(51) Int. Cl.
*H04N 19/50* (2014.01)
*H04N 19/105* (2014.01)

(Continued)

(52) U.S. Cl.
CPC .............. *H04N 19/50* (2014.11); *H04N 19/105* (2014.11); *H04N 19/136* (2014.11);

(Continued)

(58) Field of Classification Search
CPC ....... H04N 19/50; H04N 19/59; H04N 19/98; H04N 19/105; H04N 19/186
See application file for complete search history.

(56) References Cited

U.S. PATENT DOCUMENTS

| 5,539,540 A | 7/1996 | Spaulding et al. |
| 5,583,666 A | 12/1996 | Ellson et al. |

(Continued)

FOREIGN PATENT DOCUMENTS

| EP | 1146727 | 10/2001 |
| EP | 1745436 | 1/2007 |

(Continued)

OTHER PUBLICATIONS

Final Office Action mailed on Oct. 2, 2012 issued for U.S. Appl. No. 12/160,738, filed Oct. 7, 2008 in the name of Alexander Efremov et al.

(Continued)

*Primary Examiner* — Robert Leung
(74) *Attorney, Agent, or Firm* — Steinfl & Bruno LLP (57) ABSTRACT

A method for encoding high dynamic range (HDR) images involves providing a lower dynamic range (LDR) image, generating a prediction function for estimating the values for pixels in the HDR image based on the values of corresponding pixels in the LDR image, and obtaining a residual frame based on differences between the pixel values of the HDR image and estimated pixel values. The LDR image, prediction function and residual frame can all be encoded in data from which either the LDR image of HDR image can be recreated.

14 Claims, 9 Drawing Sheets

Related U.S. Application Data continuation of application No. 12/160,738, filed as application No. PCT/EP2006/008741 on Sep. 7, 2006, now Pat. No. 8,537,893.

(60) Provisional application No. 60/761,510, filed on Jan. 23, 2006.

(51) Int. Cl.
| | |
|---|---|
| *H04N 19/63* | (2014.01) |
| *H04N 19/186* | (2014.01) |
| *H04N 19/184* | (2014.01) |
| *H04N 19/187* | (2014.01) |
| *H04N 19/33* | (2014.01) |
| *H04N 19/98* | (2014.01) |
| *H04N 19/59* | (2014.01) |
| *H04N 19/136* | (2014.01) |

(52) U.S. Cl.
CPC .......... *H04N 19/184* (2014.11); *H04N 19/186* (2014.11); *H04N 19/187* (2014.11); *H04N 19/33* (2014.11); *H04N 19/59* (2014.11); *H04N 19/63* (2014.11); *H04N 19/98* (2014.11)

(56) References Cited

U.S. PATENT DOCUMENTS

| | | | |
|---|---|---|---|
| 6,301,393 | B1 | 10/2001 | Spaulding et al. |
| 6,335,983 | B1 | 1/2002 | McCarthy et al. |
| 6,571,142 | B1 | 5/2003 | Kondo et al. |
| 7,061,651 | B2 | 6/2006 | Ogino |
| 7,305,144 | B2 | 12/2007 | Fattal et al. |
| 7,433,514 | B2 | 10/2008 | Sloan |
| 7,978,764 | B2 | 7/2011 | Jung et al. |
| 8,537,893 | B2 | 9/2013 | Efremov et al. |
| 8,611,421 | B1 | 12/2013 | Efremov et al. |
| 2002/0026947 | A1 | 3/2002 | Ogino |
| 2002/0154693 | A1* | 10/2002 | Demos ............... H04N 19/0009 375/240.03 |
| 2005/0117799 | A1 | 6/2005 | Fuh et al. |
| 2005/0254722 | A1 | 11/2005 | Fattal et al. |
| 2005/0259729 | A1 | 11/2005 | Sun |
| 2005/0259730 | A1 | 11/2005 | Sun |
| 2006/0002611 | A1* | 1/2006 | Mantiuk et al. ........ H04N 19/46 382/239 |
| 2006/0104533 | A1 | 5/2006 | Daly et al. |
| 2006/0209953 | A1 | 9/2006 | Jung et al. |
| 2007/0014470 | A1 | 1/2007 | Sloan |
| 2007/0076971 | A1 | 4/2007 | Roimela et al. |

FOREIGN PATENT DOCUMENTS

| | | |
|---|---|---|
| EP | 2290983 | 6/2012 |
| EP | 2320653 | 6/2012 |
| JP | 2001008056 | 1/2001 |
| JP | 2009524371 | 6/2009 |
| WO | 2004/098167 | 11/2004 |
| WO | 2005/104035 | 11/2005 |
| WO | 2007/082562 | 7/2007 |

OTHER PUBLICATIONS

Notice of Allowance mailed on Jul. 5, 2013 issued for U.S. Appl. No. 12/160,738, filed Oct. 7, 2008 in the name of Alexander Efremov et al.
Non-Final Office Action mailed on Jan. 19, 2012 issued for U.S. Appl. No. 12/160,738, filed Oct. 7, 2008 in the name of Alexander Efremov et al.
EP Communication 94(3) with annex mailed on Apr. 10, 2013 for European Application 10186006.2 filed on Sep. 7, 2006 in the name of Max-Planck-Gesellschaft Zur Foerderung Der Wissenschaften E.V.
Korean Office Action mailed on Sep. 30, 2012 for Korean Application 10-2008-7020660 filed on in the name of Max-Planck-Gesellschaft Zur Foerderung Der Wissenschaften E.V. (English translation only).
PCT International Search Report mailed on Nov. 8, 2007 issued for PCT Application PCT/EP2006/008741 filed on Sep. 7, 2006 in the name of Max-Planck-Gesellschaft Zur Foerderung Der Wissenschaften E.V.
PCT Written Opinion mailed on Nov. 8, 2007 issued for PCT Application PCT/EP2006/008741 filed on Sep. 7, 2006 in the name of Max-Planck-Gesellschaft Zur Foerderung Der Wissenschaften E.V.
European Extended Search Report & Opinion mailed on May 14, 2012 issued for European Application 10186006.2 filed on Sep. 7, 2006 in the name of Max-Planck-Gesellschaft Zur Foerderung Der Wissenschaften E.V.
Response dated Dec. 13, 2012 to Search Opinion dated May 14, 2012 for European Application No. 10186006.2 filed on Sep. 7, 2006 in the name of Max-Planck-Gesellschaft Zur Foerderung Der Wissenschaften E.V.
Bordes, P., et al., Perceptually Adapted MPEG Video Encoding, Human Vision & Electronic Imaging, Proc. of SPIE 2000, 3959: 168-175.
Drago, F., et al., Adaptive Logarithmic Mapping for Displaying High Contrast Scenes, Eurographics 2003, 22:1-8.
Durand, F., et al., Fast Bilateral Filtering for the Display of High-Dynamic-Range Images, ACM Trans. on Graphics 2002, 21: 257-266.
Fattal, R., et al., Gradient Domain High Dynamic Range Compression, ACM Trans. on Graphics 2002, 21: 249-256.
Author Unknown, High Dynamic Range Images, White Paper, ISIS Imaging Corporation 2006, pp. 1-6.
Heckbert, P., Color Image Quantification for Frame Butter Buffer Display, Computer Graphics 1982, 16: 297-307.
Huang, K., et al., Color image denoising with wavelet thresholding based on human visual system model, Signal Processing: Image Communication 2005, 20: 115-127.
Mantiuk, R., et al., A Perceptual Framework for Contrast Processing of High Dynamic Range Images, ACM Trans. on Applied Perception 2006, 3: 286-308.
Mantiuk, R., et al., Backward Compatible High Dynamic Range MPEG Video Compression, ACM Trans. on Graphics 2006, 25: 713-723.
Mantiuk, R., et al., Perception-motivated High Dynamic Range Video Encoding, ACM Trans. on Graphics 2004, 23: 733-741.
Pattanaik, S., et al., Time-Dependent Visual Adaptation for Fast Realistic Image Display, Proceedings of ACM SIGGRAPH 2000, Computer Graphics Proceedings, Annual Conference Series, Jul. 2000, pp. 47-54.
Reinhard, E., et al., Photographic Tone Reproduction for Digital Images, ACM Trans. on Graph 2002, 21: 267-276.
Reinhard, E. et al., HDR Image Encodings, online: http://www.cs.Ucf.edu/courses/hdri/REINHARD03.pdf, printed on Jun. 13, 2005, pp. 85-114.
Schmitz, B., et al., Color Palette Restoration, CVGIP Graphical Models and Image Processing 1995, 57: 409-419.
Spaulding, K., et al., Extending the color gamut and dynamic range of an sRGB image using a residual image, Color & Research & Application 2003, 28: 251-266.
Ward, G., et al., Subband Encoding of High Dynamic Range Imagery, Association for Computing Machinery 2004, pp. 83-90.
Ward, G., et al., JPEG-HDR: A Backwards-Compatible, High Dynamic Range Extension to JPEG, ACM SIGGRAPH 2006, pp. 1-8.
Watson, A.B., et al., The Cortex Transform: Rapid Computation of Stimulated Neural Images, Computer Vision, Graphics, and Image Processing 1987, 39: 311-327.
Kabaja, K., Storing of High Dynamic Range Images in JPEG/JFIF files, Proc. of the CESCG'2005, May 2005, pp. 1-8.
Mantiuk, R., et al., Effective Compression of High Dynamic Range Image, Proc. of $5^{th}$ EURASIP Conference 2005, pp. 1-6.

(56) References Cited

OTHER PUBLICATIONS

PCT Written Opinion issued for PCT Application No. PCT/EP2006/008741 filed on Sep. 7, 2006 in the name of Max-Planck-Gesellschaft Zur Forderung Der . . . ; mailing date: Aug. 11, 2007.

EPO Search Opinion of European Application 10186006.2 filed on Sep. 7, 2006 in the name of Alexander Efremov el al.; mail date: May 3, 2012.

EPO Search Opinion of European Application 10185996.5 filed on Sep. 7, 2006 in the name of Alexander Efremov el al.; mail date: May 4, 2012.

English Translation of Office action issued for Korean application No. 10-2008-7020660 filed Aug. 22, 2008 in the name of Max__ Plank-Gesellschaft Zur Forderung Der Wissenschaften E.V.; mailing date: Sep. 30, 2012.

Notice of Allowance mailed Oct. 4, 2013 for U.S. Appl. No. 13/961,266, filed Aug. 7, 2013 in the name of Max-Plank-Gesellschaft Zur Forderung Der Wissenschaften E.V.

Notice of Allowance mailed Dec. 15, 2014 for U.S. Appl. No. 14/076,000, filed Nov. 8, 2013 in the name of Max-Plank-Gesellschaft Zur Forderung Der Wissenschaften E.V.

* cited by examiner

HIGH DYNAMIC RANGE CODECS

CROSS REFERENCE TO RELATED APPLICATIONS

The present application is a continuation of U.S. patent application Ser. No. 14/076,000, filed on Nov. 8, 2013, which, in turn, is a continuation of U.S. patent application Ser. No. 13/961,266, filed on Aug. 7, 2013 and issued as U.S. Pat. No. 8,611,421 on Dec. 17, 2013, which, in turn, is a continuation of U.S. patent application Ser. No. 12/160,738, filed on Oct. 7, 2008 and issued as U.S. Pat. No. 8,537,893 on Sep. 17, 2013, which, in turn, is a national stage entry of PCT Application PCT/EP2006/008741, filed on Sep. 7, 2006, which, in turn, claims priority to U.S. Provisional Application 60/761,510, filed on Jan. 23, 2006, all of which are incorporated herein by reference in their entirety.

TECHNICAL FIELD

The invention relates to encoding image data. The invention has particular application for encoding images or for encoding sequences of video data.

BACKGROUND

Dynamic range is a measure of the relative brightness of the brightest and darkest parts of an image. Until recently, most televisions, computer monitors and other display devices have been capable of reproducing dynamic ranges of only a few hundred to one. This is far less than the dynamic range that can be appreciated by the human eye. Display devices having greater dynamic ranges are becoming available. Such high dynamic range display devices can provide images that are much more natural and realistic than the images produced by conventional "low dynamic ranges" display devices.

High dynamic range display devices are beneficial in a wide range of applications. For example, high dynamic range display devices may be used for displaying realistic video images ranging from movies and game visuals, to visual displays in simulators such as flight simulators. High dynamic range display devices also have application in demanding imaging applications such as medical imaging.

Many current image data formats specify pixel values using 24 or fewer bits per pixel. These bits specify both the brightness and color for the pixel. 24 bits is too few to specify both a full range of colors and a brightness that can be varied smoothly over the range that a high dynamic range display is capable of reproducing. To obtain full benefit from a high dynamic range display it is necessary to provide image data capable of specifying a wide range of pixel values. Various high dynamic range data formats that provide larger numbers of bits per pixel have been developed or proposed. Such high dynamic range data formats are not typically backward compatible with prior lower dynamic range data formats.

For example, HDRV "Perception-motivated HDR Video Encoding" as described in R. Mantiuk, G. Krawczyk, K. Myszkowski, and H-P. Seidel. *Perception-motivated high dynamic range video encoding*. ACM Transactions on Graphics (Proc. of SIGGRAPH 2004), 23(3):730-38, 2004 is a lossy HDR video compression method, which, does not offer backward compatibility. The method encodes HDR pixels using 11 bits for luminance and twice 8 bits for chrominance. The resulting video stream does not contain any information on LDR frames.

JPEG HDR is described in Greg Ward and Maryann Simmons. *Subband encoding of high dynamic range imagery*. In APGV '04: Proceedings of the 1$^{st}$ Symposium on Applied perception in graphics and visualization, pages 83-90, New York, N.Y., USA, 2004. ACM Press. This method involves sub-sampling a subband layer, which can lead to the loss of high frequencies. To prevent it, the method suggest three approaches: pre-correction of LDR layer, to encode within this layer high frequencies that can be lost due to sub-sampling; post-correction which tries to restore high frequencies that has been lost rather than modifying LDR image and full-sampling, which means that no sub-sampling is performed.

There remains a need for practical methods and apparatus for encoding and decoding HDR images, especially HDR video images. There remains a particular need for such methods and apparatus that provide backward compatibility with existing hardware for reproducing lower-dynamic-range images.

SUMMARY OF THE INVENTION

This invention provides methods and apparatus for encoding high dynamic range image data and for decoding the data to provide both lower dynamic range image data and higher dynamic range image data. The methods and apparatus may be applied to encoding video data. In some embodiments of the invention the lower dynamic range data is encoded in a standard format such as a MPEG (Motion Pictures Experts Group) format.

One aspect of the invention provides a method for encoding a high dynamic range image. The method comprises obtaining a lower dynamic range image corresponding to the high dynamic range image; identifying groups of pixels in the high dynamic range image for which corresponding pixels in the lower dynamic range image all have the same pixel value; generating a prediction function based at least in part on pixel values of the pixels in the high dynamic range image belonging to each of a plurality of the groups, applying the prediction function to the lower dynamic range image to obtain a predicted image; computing a residual image representing differences between pixel values in the predicted image and corresponding pixel values in the high dynamic range image; and, encoding and storing data representing the lower dynamic range image, the prediction function and the residual image.

Other aspects of the invention provide methods for decoding high dynamic range images that have been encoded according to the invention and apparatus for encoding and/or decoding high dynamic range images.

Further aspects of the invention and features of specific embodiments of the invention are described below.

BRIEF DESCRIPTION OF THE DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
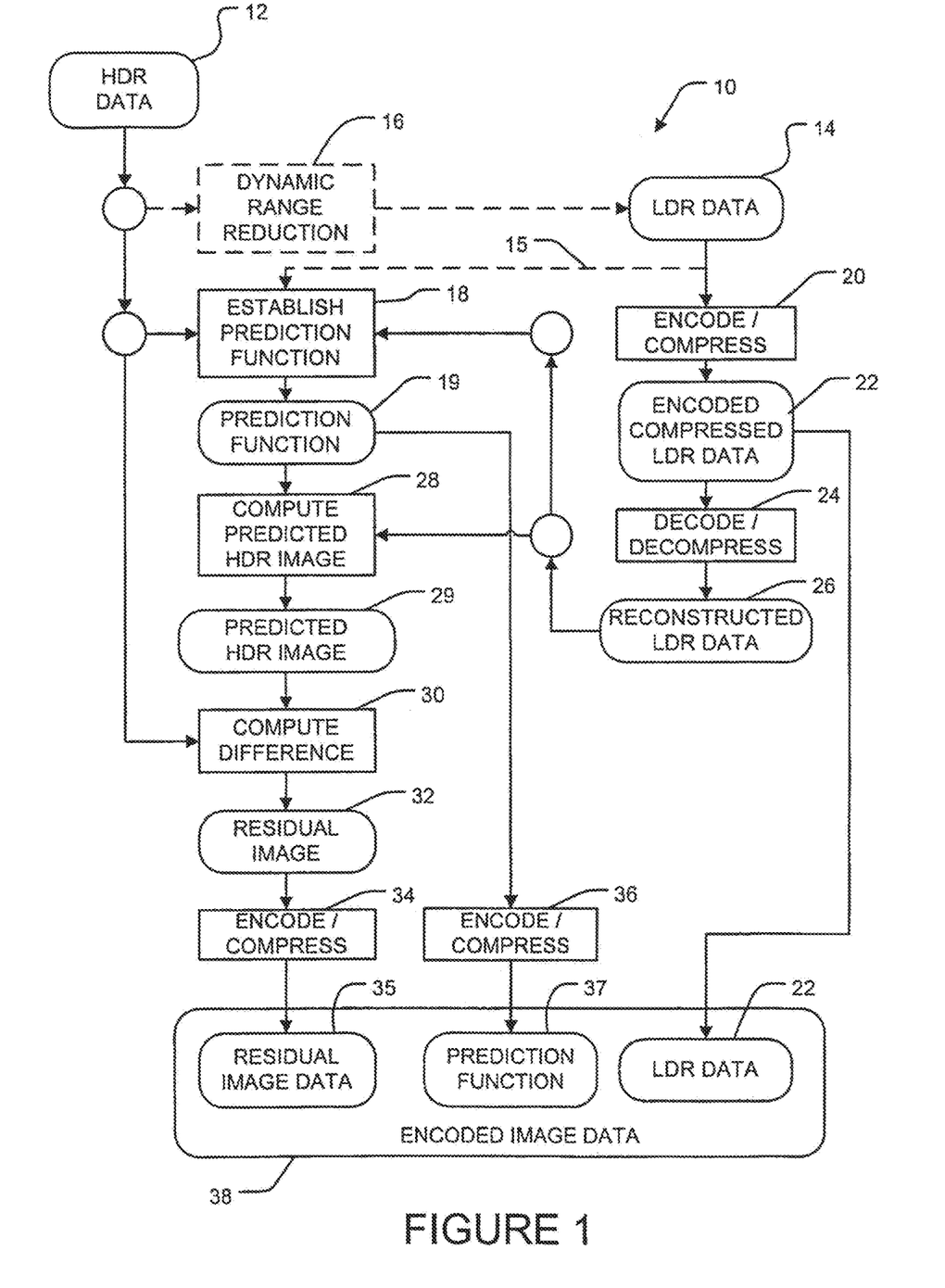
FIG. 1 is a flow chart illustrating an encoding method according to an embodiment of the invention.

FIG. 1 shows a method 10 for encoding a frame of image data according to a basic embodiment of the invention. Method 10 encodes both high dynamic range (HDR) data 12 and lower dynamic range (LDR) data 14 into encoded image data 38. As described below, encoded image data 38 can be decoded to reconstruct both LDR data and HDR data.

By way of example only, HDR data 12 may be represented in a color space such the absolute CIE XYZ (2E standard observer) color space in which the color and brightness of each pixel are specified by three floating point numbers. LDR data 14 may be represented in a color space such as the sRGB color space in which the color and brightness of each pixel are specified by three bytes. In some embodiments, LDR data 14 is derived from HDR data 12 (or a precursor of HDR data 12) by a suitable dynamic range reduction process 16.

Dynamic range reduction may comprise tone mapping and/or gamut mapping, for example. Any suitable tone mapping operator or gamut mapping may be used. For example, a tone mapping operator may be chosen to saturate both luminance and color, change color vales and enhance local contrast. Such changes may result in a lower compression ratio, but both LDR and HDR frames will be preserved in the resulting video stream.

In block 18 method 10 establishes a prediction function 19. Prediction function 19 provides as an output a predicted pixel value for a pixel in HDR data 12 based upon the pixel value for the corresponding pixel in LDR data 14. Since the goal is to be able to reproduce HDR data 12 and LDR data 14 from encoded image data 38 it is preferable to base prediction function 19 on a version of LDR data 14 that can be reconstructed from encoded image data 38.

Where LDR data 14 is encoded and compressed using a lossy algorithm, it is not possible to guarantee that the reconstructed version of LDR data 14 will be identical to the original LDR data 14. For this reason, FIG. 1 shows that block 19 receives as an input reconstructed LDR, data 26. Reconstructed LDR data 26 is obtained by encoding/compressing LDR data 14 in block 20 to provide encoded compressed LDR data 22 and then decoding/decompressing encoded compressed LDR data 22 in block 24. Encoded compressed LDR data 22 is included in encoded image data 38. Line 15 illustrates a less accurate alternative in which block 18 uses LDR data 14 directly to establish prediction function 19.

Prediction function 19 preferably exploits statistical relationships between pixel values in reconstructed LDR data 26 and corresponding pixel values in HDR data 12. In general, if one takes all pixels in reconstructed LDR image 26 for which the pixels all have the same particular pixel value, the corresponding pixels in HDR image data 12 will not all have the same pixel value. That is, in general, there is a one-to-many relationship between LDR pixel values and HDR pixel values.

Figure 1A:
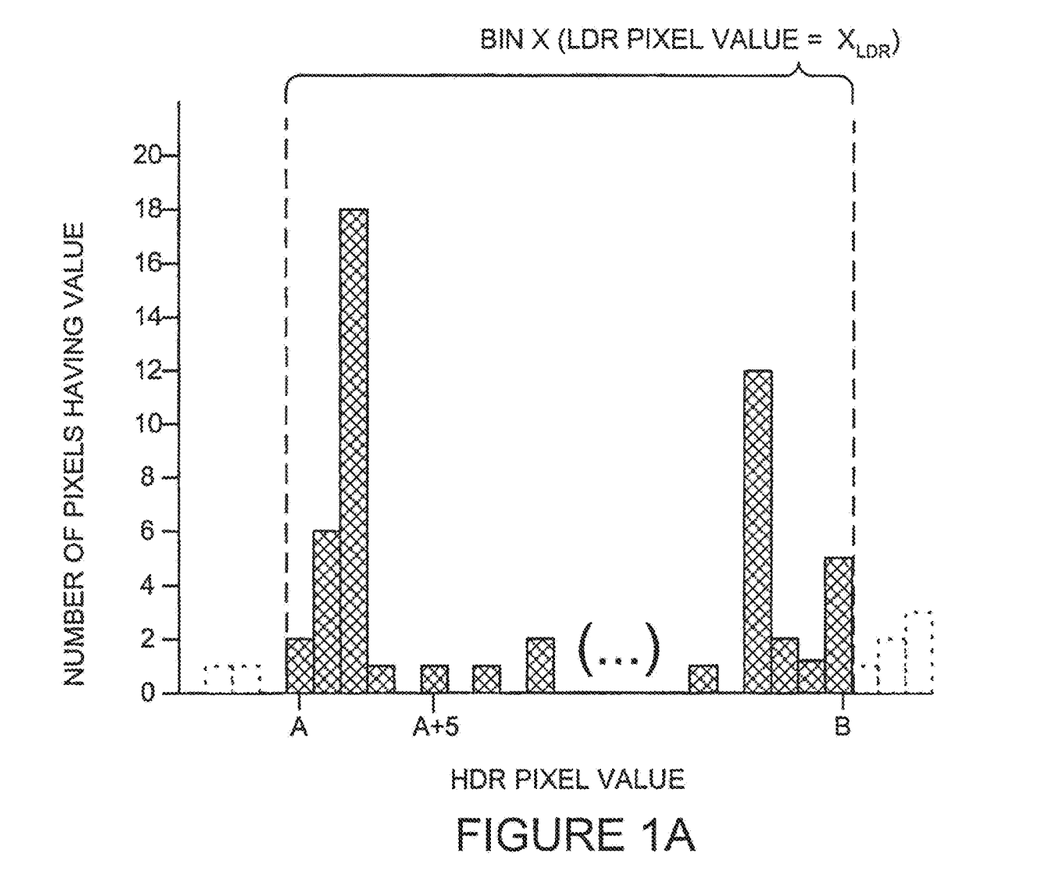
FIG. 1A is a histogram of pixel values from a high dynamic range image for which corresponding pixels in a lower dynamic range version of the image all have the same pixel value.

FIG. 1A is a histogram in which the horizontal axis ranges over all possible HDR pixel values and the vertical axis indicates how many pixels in the image represented by HDR image data 12 have that value. There may be a significant number of pixel values for which the image does not have any pixels that have that value. The shaded bars in FIG. 1A represent values of pixels in HDR image data 12 for which the corresponding pixels in reconstructed LDR image data 26 all have the same pixel value $X_{LDR}$. The HDR pixel values that correspond to LDR pixel value $X_{LDR}$ range from A to B. All of the HDR pixel values for pixels that correspond to the same pixel value in reconstructed LDR image data 26 may be called a bin. It is typical, but not mandatory, that different bins do not overlap.

A prediction function 19 for an image may be obtained from HDR image data 12 and reconstructed LDR image data 26 by collecting HDR pixel values into bins and statistically analyzing each of the bins. Collecting the HDR pixel values into bins may comprise:

taking reconstructed LDR image data 26, and for each pixel value represented in reconstructed LDR image data 26 identifying the set of all pixels that have that pixel value;

for each of the sets of pixels identifying the corresponding pixels in HDR data 12 and determining the pixel values of those corresponding pixels to yield a set of all of the HDR pixel values that corresponds to each LDR pixel value.

Prediction function 19 may be obtained by any of:

finding the arithmetic mean of the HDR pixel values in each bin;

finding the median of the HDR pixel values in each bin;

finding the average of the values A and B that delimit the bin;

some combination of these; or the like.

It is believed that for many applications the arithmetic mean provides a good combination of accuracy and computational efficiency.

Given a prediction function 19 it is only necessary to encode differences between the values predicted by prediction function 19 and the actual values from HDR image data 12. Such differences are usually close to zero and therefore can be efficiently compressed in residual frames.

Prediction function 19 needs to be defined only for the possible pixel values in the LDR data 14 (256 values in the case where pixel values are represented by an 8-bit number). Prediction function 19 may comprise a lookup table that is indexed by valid values for LDR pixels. Prediction function 19 may be implemented as a lookup table having one output value corresponding to each index value. For example, where LDR pixels have 8-bit values, the lookup table may comprise 256 different values indexed by integers in the range of 1 to 256. Prediction function 19 does not need to be continuous since its major role is to make the values of residual frames as small as possible. In the alternative, prediction function 19 may be partly or entirely represented by a suitably parameterized continuous curve.

In block 28 method 10 obtains a predicted HDR image by applying prediction function 19 to reconstructed LDR data 26. The pixel value for each pixel of reconstructed LDR data 26 is applied as an input to prediction function 19 and the pixel value is replaced with the resulting output from prediction function 19 to yield a predicted HDR image 29.

Block 30 computes a difference between predicted HDR image 29 and the image of HDR data 12 to provide a residual image 32. Residual image 32 is encoded/compressed in block 34 and output as residual image data 35 to encoded image data 38. Block 34 may comprise filtering and quantizing residual image 32 to remove information that will not have a discernable effect (or, with more aggressive filtering and/or quantization an excessively deleterious effect) on the fidelity of a HDR image reconstructed from encoded image data 38.

Figure 2:
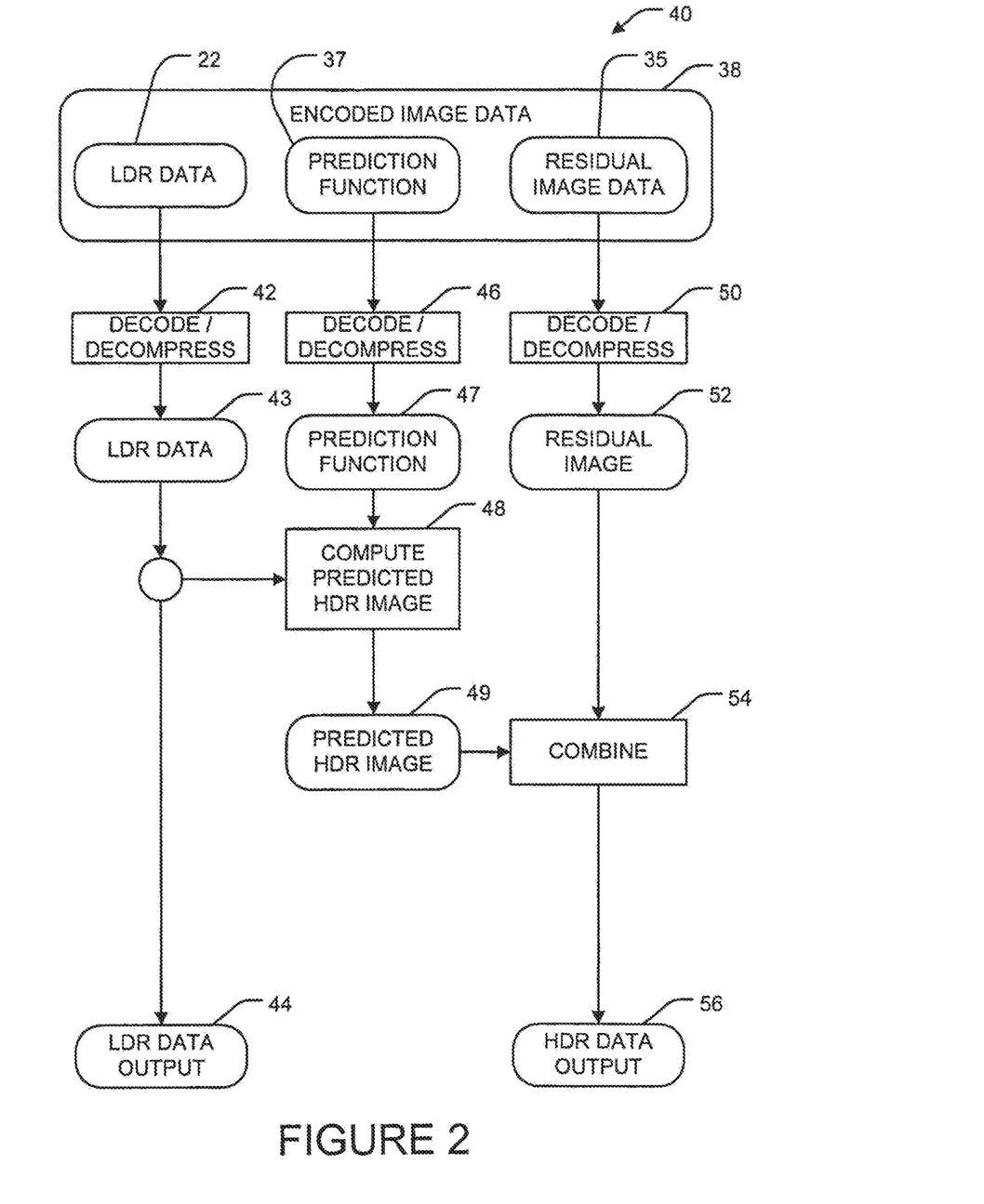
FIG. 2 is a flow chart illustrating a decoding method according to the invention.

FIG. 2 shows a method 40 for decoding encoded image data 38. LDR data 22 may be extracted from encoded image data 38 and decoded/decompressed in block 32 to yield LDR data 43 that is output as an LDR data output 44. If LDR data output 44 is all that is required then no further processing need be done.

If an HDR data output 56 is also required then prediction function 37 is decoded at block 46 to yield prediction function 47 and residual image data 35 is decoded/decompressed at block 50 to yield residual image 52.

In block 48, prediction function 47 is applied to LDR, data 43 to yield a predicted HDR image 49. In block 54 the predicted HDR image 49 is combined with residual image 52 to yield HDR data output 56. A decoder that operates as shown in FIG. 2 can be backwards-compatible with systems and devices that require LDR data output 44 while providing high quality HDR data at HDR data output 56.

Methods 19 and 49 may be performed by:
- programmed data processors, which may comprise one or more microprocessors, digital signal processors, some combination thereof, or the like executing software that causes the data processors to implement the methods;
- hardware circuits, for example circuits that include functional blocks that cooperate to implement the method—the circuits may comprise, for example, suitably configured field-programmable gate arrays ("FPGAs") or application-specific integrated circuits ("ASICs"); or,
- performing some parts of the methods in programmed data processors and other parts of the methods in suitable hardware circuits.

Figure 3:
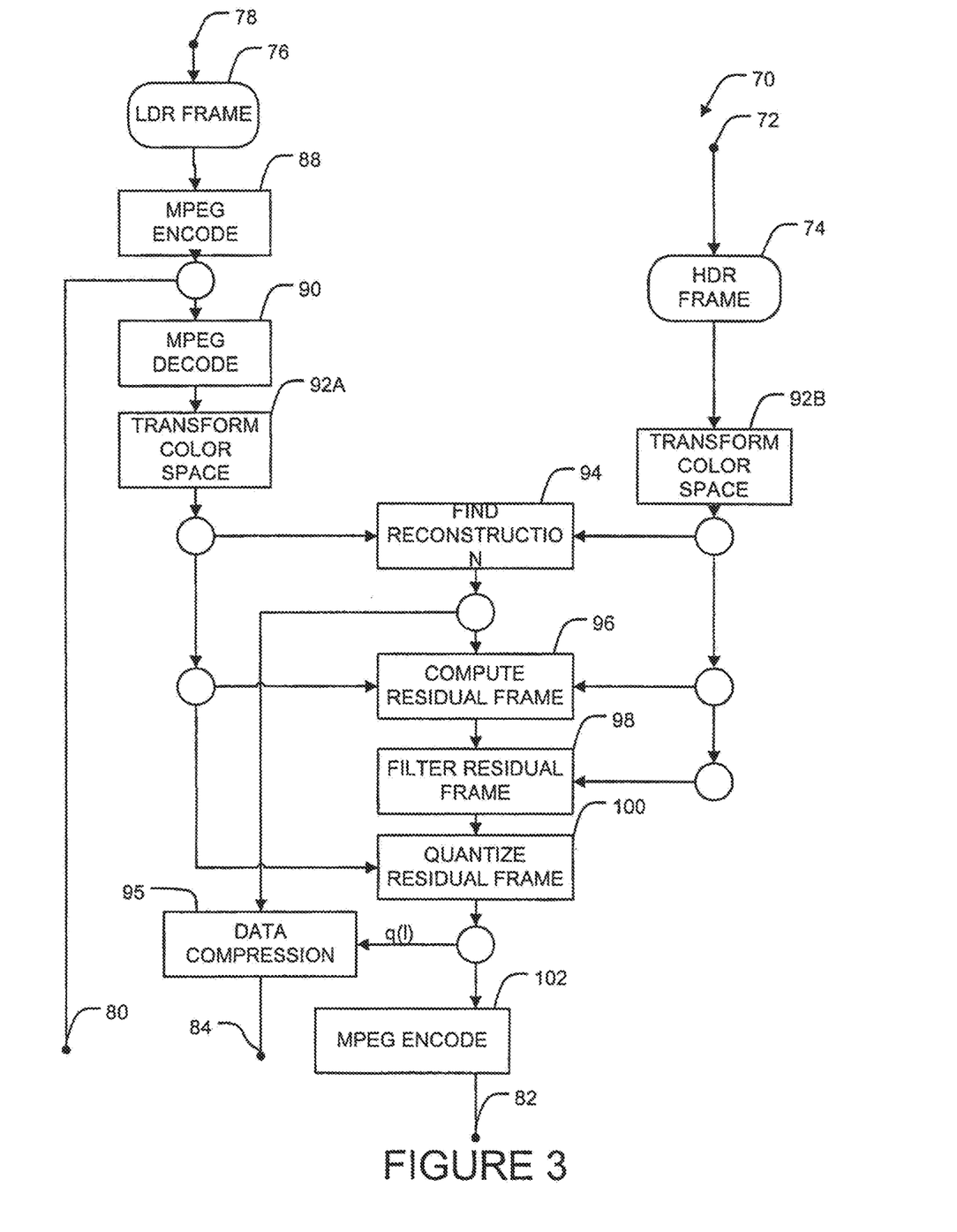
FIG. 3 is a flow chart illustrating an MPEG encoding method according to a specific embodiment.
Figure 4A:
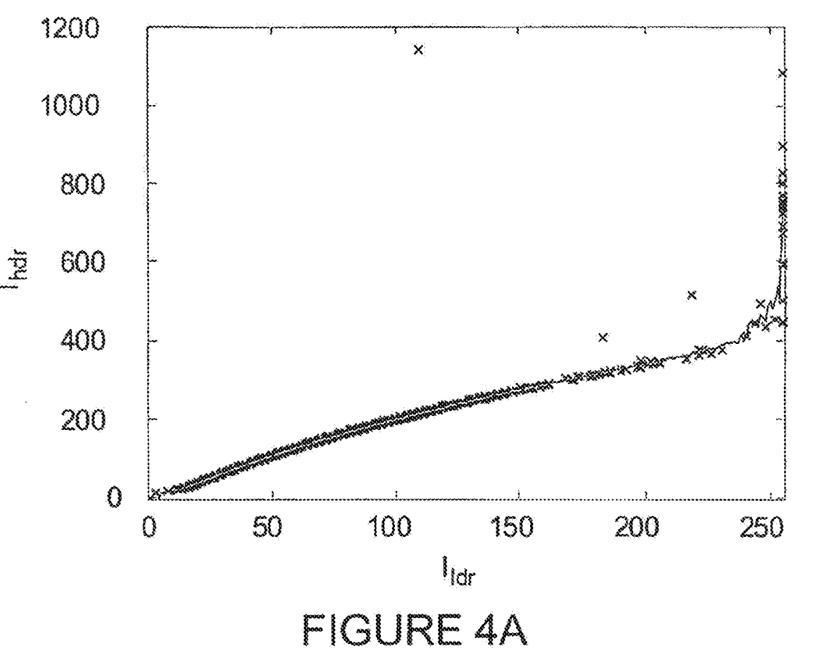
FIGS. 4A through 4F show the relationship between luma values in corresponding HDR and LDR images for various tone mapping algorithms.
Figure 4B:
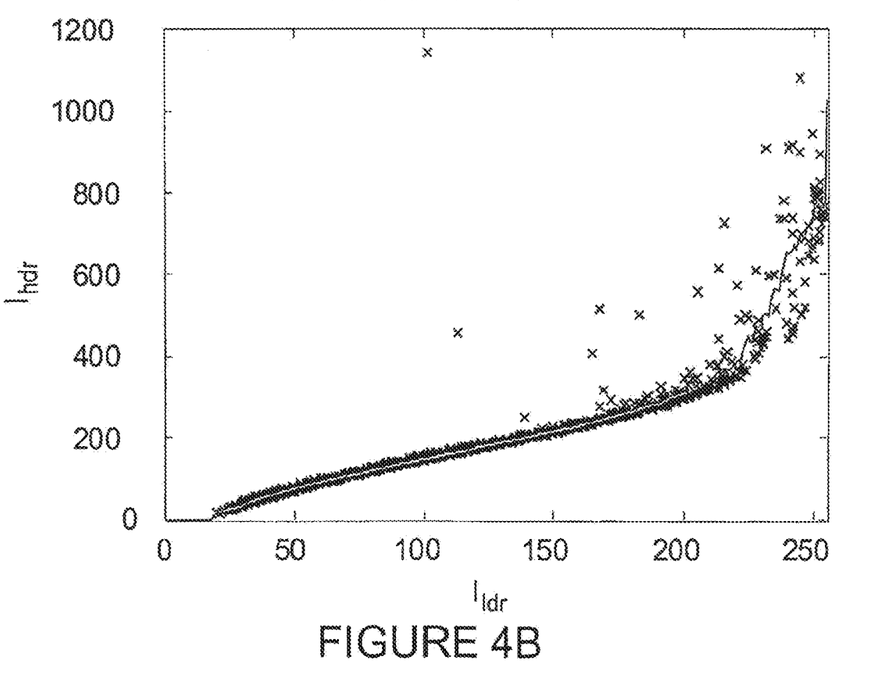
Figure 4C:
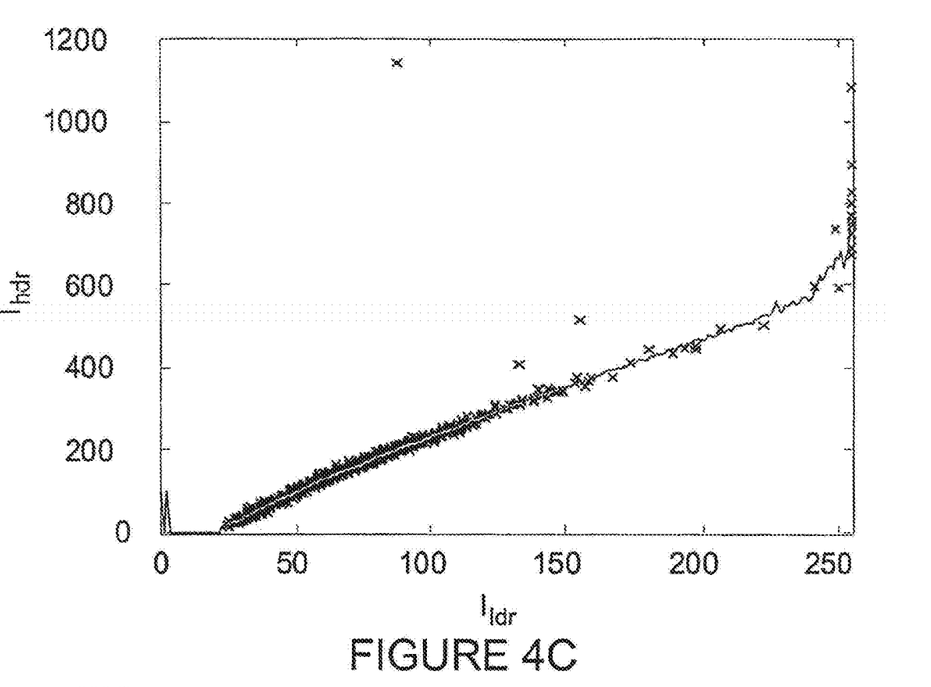
Figure 4D:
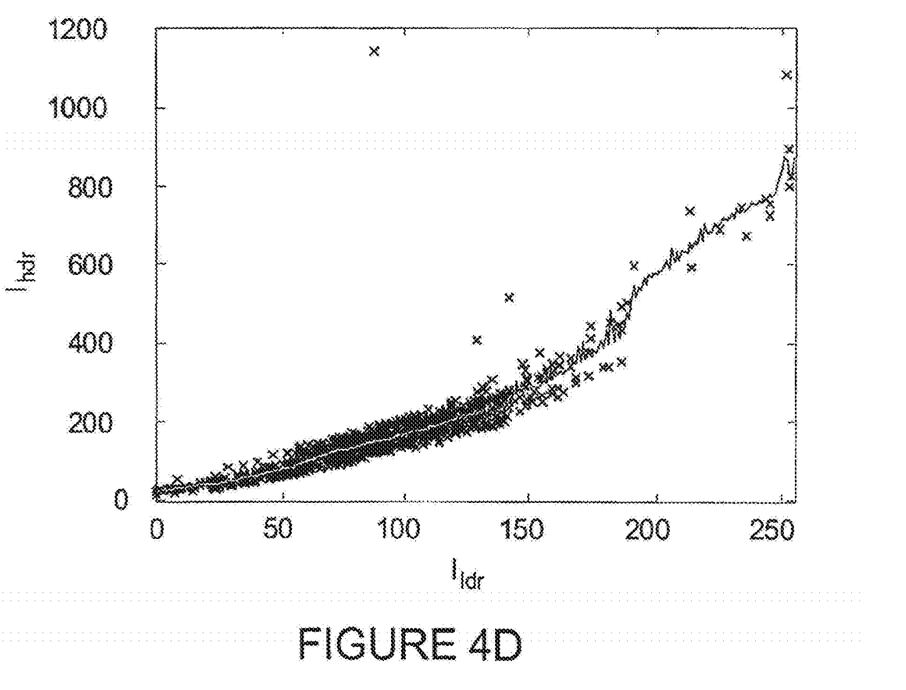
Figure 4E:
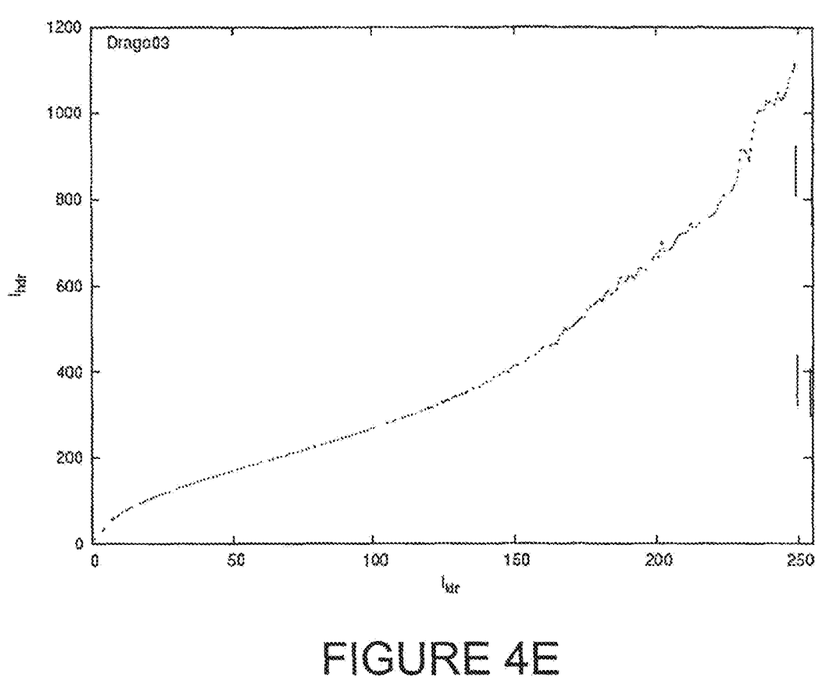
Figure 4F:
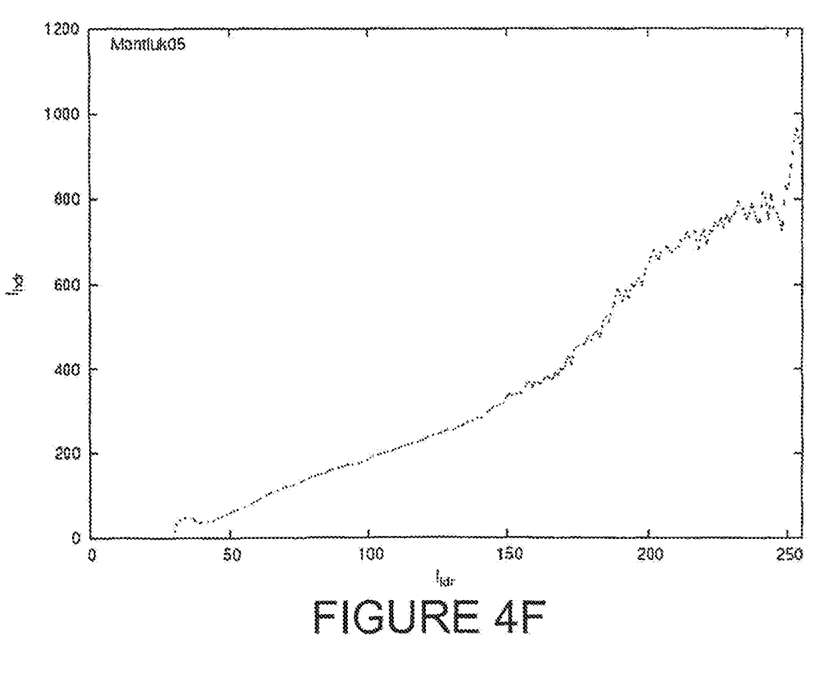

FIG. 3 shows a method 70 according to a more specific example embodiment. Method 70 encodes video frames in a way that complies with the standards set by the Motion Pictures Experts Group (MPEG) standards. Method 70 receives two incoming streams of video data. A stream containing HDR frames 74 is received at input 72. A stream containing LDR frames 76 is received at input 78. LDR frames 76 may be derived from HDR frames 74 or some precursor of HDR frames 74 upstream from input 78.

An encoder operating as shown in FIG. 3 produces three compressed streams: a LDR stream 80, which may be fully compatible with MPEG; a residual stream 82, which contains differences between LDR frames 76 and the corresponding HDR frames 74; and an auxiliary stream, 84 which contains auxiliary data for reconstructing HDR frames 74. The best performance can be achieved when residual stream 82 and auxiliary stream 84 do not duplicate the information encoded in LDR stream 80.

LDR frames 76 are encoded in block 88 using a suitable encoder. For example, block 88 may use an MPEG video encoder compatible with the ISO/IEC 14496-2 standard. Other video encoders may be used in the alternative. The resulting video stream may be encapsulated in a suitable media container format, such as Audio Video Interleave (AVI) or QuickTime™, so that it can be recognized and played back by existing software.

In block 90 the MPEG encoded LDR frames are decoded. To minimize computation, the decoding in block 90 may be performed by the MPEG encoder used in block 88. MPEG encoders typically decode frames internally for use in estimating motion vectors. Block 90 may comprise accessing the decoded frames generated by the MPEG encoder. In the alternative, block 90 may be performed independently from block 88.

The output from block 90 will generally different from the input to block 88 because MPEG is a lossy compression method. LDR frames that are MPEG encoded and then decoded are not exactly the same as the original LDR frames but contain compression artifacts.

In blocks 92A and 92B the color spaces of one or both of LDR frames 76 and HDR frames 74 are transformed, if necessary, to provide LDR frames and HDR frames that are represented in mutually compatible color spaces. Which transformations, if any, are performed in blocks 92A and 92B depends upon the color spaces of incoming LDR frames 76 and HDR flames 74. In some cases blocks 92A and 92B are not required. In other cases, only one of blocks 92A and 92B is required.

HDR and LDR color spaces are compatible when color channels of both the LDR and HDR color spaces represent approximately the same information. It is also desirable that the HDR and LDR color spaces be perceptually uniform. Perceptual uniformity facilitates the estimation of color differences according to perceivable, rather than arithmetic, differences. It is also desirable that the HDR color space preserve a broad color gamut, ideally the full visible color gamut, even though the full visible color gamut cannot be displayed on the existing displays.

The inventors consider that a good color space for use in representing HDR image data is a combination of the CIE 1976 Uniform Chromacity Scales ($u_0$, $v_0$) with the gamma correction of the sRGB color space. Other color spaces could also be used. In one example, incoming LDR frames 76 are represented in the sRGB color space while incoming HDR frames 74 are represented in the CIE XYZ (2E standard observer) color space. In this case, block 92A comprises converting LDR pixels from the sRGB color space to the $l_{ldr}u_{ldr}v_{ldr}$ space. This can be done by computing the CIE XYZ color coordinates and then computing luma and u' and v' color coordinates from the XYZ values. The XYZ values may be determined using the sRGB conversion formulas given in IEC 61966-2-1:1999. *Multimedia systems and equipment—Colour measurement and management—Part 2-1: Colour management—Default RGB colour space—sRGB*. International Electrotechnical Commission, 1999. For example for the $R_{8\text{-}bit}$ is the 8-bit color coordinate:

$$R' = \frac{R_{8-bit}}{255} \quad (1)$$

$$R = \begin{cases} R'/12.92; & \text{if } R' \leq 0.04045 \\ ((R'+0.055)/1.055)^{2.4}; & \text{otherwise} \end{cases} \quad (2)$$

The $G_{8\text{-}bit}$ and $B_{8\text{-}bit}$ color coordinates may be converted to floating point values similarly and then X, Y, and Z may be determined from:

$$\begin{bmatrix} X \\ Y \\ Z \end{bmatrix} = \begin{bmatrix} 0.4124 & 0.3576 & 0.1895 \\ 0.2126 & 0.7152 & 0.0722 \\ 0.0193 & 0.1192 & 0.9505 \end{bmatrix} \cdot \begin{bmatrix} R \\ G \\ B \end{bmatrix} \quad (3)$$

The example matrix in Equation (3) assumes the white point D65. Luma can be computed for each LDR pixel by using suitable corrected color values. For example, luma may be given by:

$$l_{ldr}=0.2126 \times R_{8-bit}+0.7152 \times G_{8-bit}+0.0722 \times B_{8-bit} \quad (4)$$

where: $l_{ldr}$ is the luma value for an LDR pixel. Luma is the weighted sum of the non-linear R' G' B' components after gamma correction has been applied.

The chromaticities u' and v' may be obtained from:

$$u' = \frac{4X}{X+15Y+3Z} \quad (5)$$

and $$v' = \frac{9Y}{X+15Y+3Z} \quad (6)$$

then 8-bit numbers $u_{ldr}$ and $v_{ldr}$ can be obtained by multiplying each of u' and v' by a suitable scaling factor such as:

$$u_{ldr}=u' \times 410 \quad (7)$$

and $$v_{ldr}=v' \times 410 \quad (8)$$

In the transformed color space, each pixel of the LDR data is represented by the pixel values $l_{ldr}$, $v_{ldr}$, $u_{ldr}$.

Block 92B may transform color values of HDR frames 74 in substantially the same manner as described above for the LDR pixel values. Ordinary gamma correction typically cannot be used for the range of luminance values that may be specified in an HDR frame. Therefore, some embodiments use a perceptually uniform luminance representation that has been derived from the contrast detection measurements for human observers. This space has properties similar to a space in which LDR pixel values are gamma corrected but can encode the full visible range of luminance (using 11-12 bits for example).

In an example embodiment, HDR luminance, y, is transformed into 12-bit HDR luma, $l_{hdr}$, by the formula:

$$l_{hdr}(y) = \begin{cases} a \cdot y & \text{if } y < y_l \\ b \cdot y^c + d & \text{if } y_l \leq y < y_h \\ e \cdot \log(y) + f & \text{if } y \geq y_h \end{cases} \quad (9)$$

where constants are listed it Table I below. The inverse transformation is given by:

$$y(l_{hdr}) = \begin{cases} a' \cdot l_{hdr} & \text{if } l_{hdr} < l_l \\ b'(l_{hdr}+d')^c & \text{if } l_l \leq l_{hdr} < l_h \\ e' \cdot \exp(f' \cdot l_{hdr}) & \text{if } l_{hdr} \geq l_h \end{cases} \quad (10)$$

where the various constants used in Equation (9) and (10) are listed in Table I below.

TABLE I

Example Constants for Equations (9) and (10)

| a | b | c | d | e | f |
|---|---|---|---|---|---|
| 17.554 | 826.81 | 0.10013 | −884.17 | 209.16 | −731.28 |

| $y_l$ | | | $y_h$ | | |
|---|---|---|---|---|---|
| 5.6046 | | | 10469 | | |

| a' | b' | c' | d' | e' | f' |
|---|---|---|---|---|---|
| 0.056968 | 7.3014e−30 | 9.9872 | 884.17 | 32.994 | 0.00478 |

| $l_l$ | | | $l_h$ | | |
|---|---|---|---|---|---|
| 98.381 | | | 1204.7 | | |

Block 94 generates a prediction function for the HDR image data. The prediction function attempts to predict a pixel value for a pixel in the HDR image data based upon a corresponding pixel value for the corresponding pixel in the LDR image data. The prediction function is ideally chosen to minimize the number of pixels in the HDR in data that have values that differ significantly from the values predicted by the prediction function. The prediction function is preferably non-linear in the logarithmic domain.

In cases where pixel values representing chromaticity in the HDR data are almost the same as the corresponding pixel values in the LDR image data, it is not beneficial to compute a prediction function for the chromaticity pixel values (e.g. u' and v'). In such cases, it is only necessary to provide a prediction function for the brightness values (e.g. luma, luminance or the like).

Since LDR frames 76 and HDR frames 74 contain similar information, these frames are strongly correlated. Where LDR frames 76 are obtained by applying a tone mapping algorithm to HDR frames 74, the particular nature of the correlation depends upon what tone mapping algorithm was used.

FIGS. 4A through 4F show how the luma values of a LDR frame relate to the luma values of a corresponding HDR frame. Each of these Figures applies a different tone mapping function to derive an LDR image from an example HDR image. These tone mapping functions provide, generally linear relationships between $l_{ldr}$ and $l_{hdr}$ at lower values. There is more variation between the tone mapping functions for higher luminance values. In each of FIGS. 4A to 4D, LDR luma values are plotted on the horizontal axis and HDR luma values are plotted on the vertical axis. The points marked X indicate the pixel values of corresponding pixels in the LDR and HDR images.

FIGS. 4A to 4F correspond respectively to the tone mapping functions disclosed in:

S. Pattanaik, J. E. Tumblin, H Yee, and D. P. Greenberg. *Time dependent visual adaptation for realistic image display*. In Proceedings of ACM SIGGRAPH 2000, Computer Graphics Proceedings, Annual Conference Series, pages 47-54, July 2000.

Erik Reinhard, Michael Stark, Peter Shirley, and Jim Ferwerda. *Photographic tone reproduction for digital images*. ACM Trans, on Graph., 21(3):267-276, 2002.

Frédo Durand and Julie Dorsey. *Fast bilateral filtering for the display of high-dynamic-range images*. ACM Trans. on Graph, 21(3):257-266, 2002.

Raanan Fattal, Dani Lischinski, and Michael Werman. *Gradient domain high dynamic range compression*. ACM Trans. on Graph., 21(3):249-256, 2002.

Frédéric Drago Karol Myszkowski, Thomas Annen, and Norishige Chiba. *Adaptive logarithmic mapping for displaying high contrast scenes*. Computer Graphics Forum proceedings of Eurographics 2003, 22(3):419-426, 2003.

Rafal Mantiuk, Karol Myszkowski, and Hans-Peter Seidel. *A perceptual framework for contrast processing of high dynamic range images*. In APGV '05: Proceedings of the 2nd Symposium on Applied Perception in Graphics and Visualization, pages 87-94, New York, N.Y., USA, 2005, ACM Press.

The prediction function may be generated as described above. Where the prediction function is defined as the arithmetic mean of the values of all HDR pixels falling into a corresponding bin, then the prediction can be written as:

$$RF(l) = \frac{1}{\text{card}(\Omega_l)} \sum_{i \in \Omega_l} l_{hdr}(i) \qquad (11)$$

where $\Sigma_i = \{i=1 \ldots N * 1_{ldr}(i)=l\}, l=0 \ldots 255$;
N is the number of pixels in a frame and $l_{ldr}(i)$ and $l_{hdr}(l)$ are the luma values for the $i^{th}$ pixel in the LDR and HDR frames respectively. The prediction function is preferably updated for each frame.

In FIGS. 4A to 4F, the prediction functions are shown as solid lines. The prediction functions will depend on the image content as well as on the tone-mapping function used. FIGS. 4A through 4F show prediction functions for typical HDR images. FIGS. 4A to 4F show that typical prediction functions tend to be slowly changing with an increasing slope over significant portions of their range. Therefore, in some embodiments, instead of encoding the values of the prediction function for every bin, the differences between prediction function values for two consecutive bins are encoded. To further reduce the number of bits, these differences can be compressed, for example, using an adaptive Huffman algorithm as indicated in block 95. The size of auxiliary data stream 84 is 1% or less of the total stream size in some embodiments. Therefore the storage overhead of a prediction function can be almost insignificant. Prediction functions or parts of prediction functions may also be represented in other ways, for example, as parameterized polynomial curves, spline curves, or other parameterized functions.

In block 96 residual frames are computed. The pixel values in the residual frame each represent the difference between the pixel value for the corresponding pixel of the HDR frame and the pixel value for that pixel predicted by applying the prediction function to the pixel value of the corresponding pixel of the LDR frame. Block 96 may be performed separately for each pixel value (l, u and v in this example). For luminance values, each pixel $r_l(i)$ in the residual frame may be calculated as:

$$r_l(i) = l_{hdr}(i) - RF(l_{ldr}(i)) \qquad (12)$$

for chromatic values, the prediction function may be an identity function, in which case:

$$r_u(i) = u_{hdr}(i) - u_{ldr}(i) \qquad (13)$$

and $$r_v(i) = v_{hdr}(i) - v_{ldr}(i) \qquad (14)$$

A properly chosen prediction function can reduce the amount of data that encodes HDR frames significantly. Despite this saving, residual frames can still contain a significant amount of noise that does not visibly improve the quality of reconstructed HDR images. The compression ratio can be improved without causing a noticeable reduction in image quality by filtering the residual frames to reduce or eliminate this noise. Block 98 filters the residual frames. The signal in residual frames is often relatively close to the visibility threshold. Therefore, filtering can result in significant reduction of data without significant degradation in the quality of HDR images reconstructed from the data.

Figure 5:
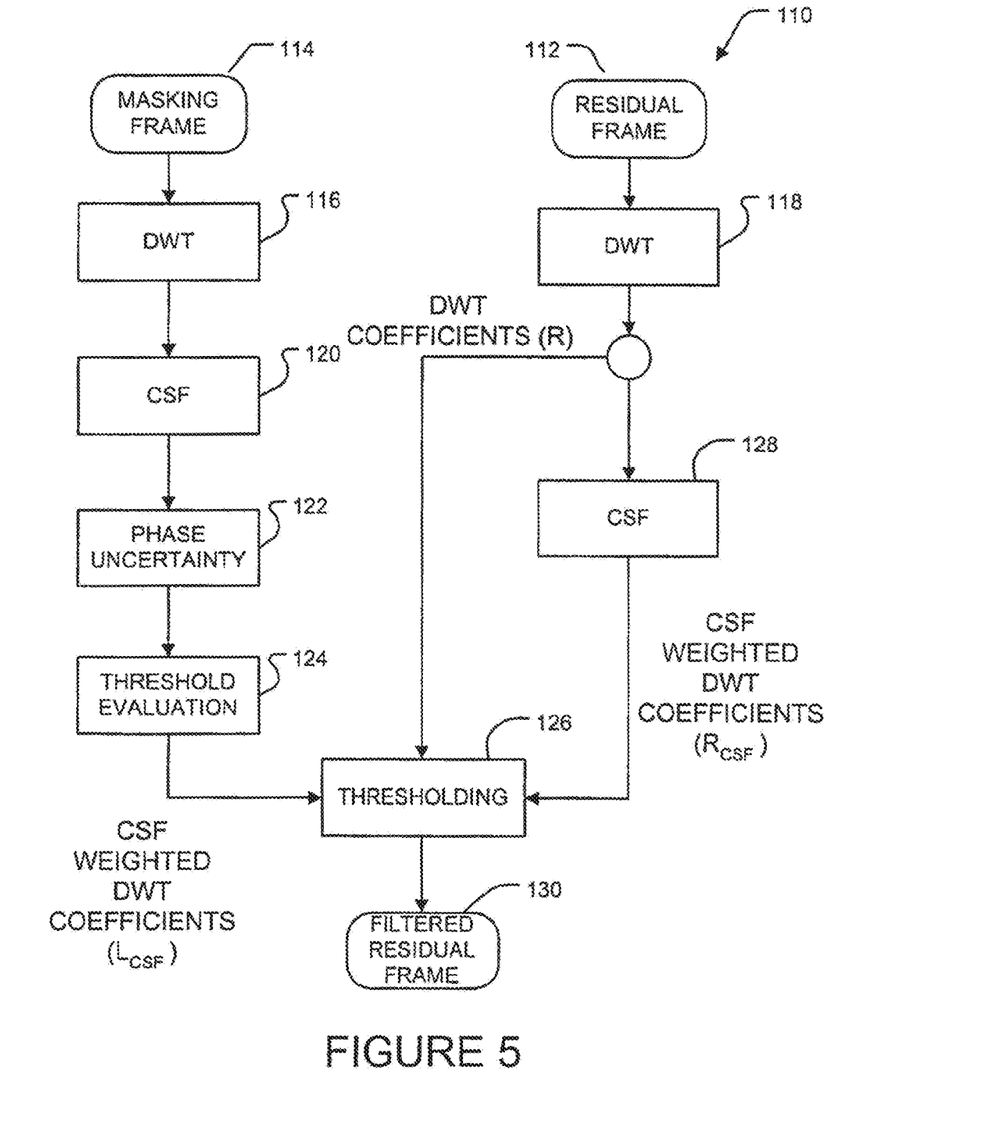
FIG. 5 shows a method for filtering residual image data according to an embodiment of the invention; and, FIG. 6 is a plot illustrating bit rate as a function of an image quality parameter for a prototype encoding system.

An output of block 98 is a residual frame in which high frequencies have been attenuated in those regions were they are not visible. FIG. 5 shows a method 110 that may be applied for filtering residual frames. Method 110 may be performed in the context of an encoding method according to the invention but also has application in other contexts where it is desired to reduce the amount of data representing an image without introducing visible artifacts into the image.

The description that follows describes processing that is done on a luma channel. The same processing may be also applied to chroma channels. The chroma channels may be subsampled, for example to half of their original resolution to reduce processing. This reduction approximately accounts for differences in luminance and chrominance CSF.

Method 110 receives a residue frame 112 and a HDR frame 114 that masks the residue frame. In blocks 116 and 118 a Discrete Wavelet Transform (DWT) is applied to split each of masking frame 114 and residue frame 112 into several frequency- and orientation-selective channels. Other suitable transforms, such as the cortex transform described in A. B. Watson. *The cortex transform: Rapid computation of simulated neural images*. Computer Vision Graphics and Image Processing, 39:311-327, 1987, may be applied in place of the DWT. The cortex transform can be very computationally-intensive and so is practical only if sufficient computational resources are available.

A prototype embodiment uses the CDF 9/7 discrete wavelet basis (which is used also for the lossy compression of images according to the JPEG-2000 standard). This wavelet basis gives a good trade-off between smoothness and computational efficiency. In the prototype, only the three finest scales of the wavelet decomposition are used since filtering of lower spatial frequencies at coarser scales could lead to noticeable artifacts.

In block 120 a function such as a contrast sensitivity function (CSF) is applied to account for the lower sensitivity of the human visual system for high spatial frequencies. Applying the CSF involves weighting each band of wavelet coefficients by a constant value. Example weighting factors for a viewing distance of 1700 pixels are given in Table 2.

TABLE 2

| | CSF coefficients | | |
|---|---|---|---|
| Scale | LH | HL | HH |
| 1 | 0.275783 | 0.275783 | 0.090078 |
| 2 | 0.837755 | 0.837755 | 0.701837 |
| 3 | 0.999994 | 0.999994 | 0.999988 |

Human visual channels have limited phase sensitivity. This provides a further opportunity to discard information without noticeable degradation of reconstructed images. A masking signal does not only affect regions where the values of wavelet coefficients are the highest, but it may also affect neighboring regions. Phase uncertainty also reduces the effect of masking at edges, as opposed to textures which show higher amounts of masking.

Phase uncertainty may be modelled with the $L_{0.2}$ norm, which is also used in JPEG-2000 image compression. The $L_{0.2}$ norm is given by:

$$\overline{L}_{CSF} = \frac{1}{card(\Theta)}\left(\sum_\theta |L_{CSF}|^{0.2}\right)^{\frac{1}{0.2}} \quad (15)$$

and mathematical equivalents thereof where 1 denotes the neighbourhood of a coefficient (a 13H13 box is used as the neighbourhood in the prototype implementation), $L_{CSF}$ is a wavelet coefficient that has been weighted by applying a CSF factor and $\overline{L}_{CSF}$ is the CSF-weighted wavelet coefficient after taking phase uncertainty into account.

Block 124 predicts how threshold contrast changes in the presence of the masking signal from original HDR frame 114. To model contrast masking, one can employ a threshold elevation function. The threshold elevation function may, for example, have the form:

$$T_e(\overline{L}_{CSF}) = \begin{cases} 1 & \text{if } \overline{L}_{CSF} \leq a \\ (c \times \overline{L}_{CSF})^b & \text{otherwise} \end{cases} \quad (16)$$

In the prototype embodiment, the constants in Equation (16) are given by a=0.093071 and b=1.0299 and c=11.535.

Each CSF-weighted coefficient for the residual frame, $R_{CSF}$, is compared to the value of the corresponding threshold elevation $T_e$ calculated from original HDR frame 114. If $R_{CSF}$ is smaller than the visibility threshold $T_e$ from Equation (16), the coefficient may be set to zero without introducing changes in the eventual reconstructed image that are noticeable. This may be expressed by:

$$R_{filt} = \begin{cases} 0 & \text{if } T_e(\overline{L}_{CSF}) \leq R_{CSF} \\ R & \text{otherwise} \end{cases} \quad (17)$$

Finally, the filtered wavelet coefficients, $R_{filt}$ are transformed back to the image domain. The prefiltering method presented above can substantially reduce the size of a residual stream. The filtering is a reasonable trade-off between computational efficiency and accuracy of the visual model. Filtering as described herein typically increases encoding time by no more than about 80%. Filtering during encoding does not increase decoding times.

Returning to FIG. 3, block 100 quantizes the altered residual frames. Although the magnitudes of the differences encoded in residual frames are usually small, they can take values in the range of !4095 to 4095 (for 12-bit HDR lama encoding). Obviously, such values cannot be encoded using 8-bit MPEG encoder. Although the MPEG standard provides an extension for encoding lama values on 12 bits, such an extension is rarely implemented, especially in hardware.

Quantization block 100 permits the magnitude of residual values to be reduced, preferably sufficiently that those values can be encoded using a standard 8-bit MPEG encoder. Various quantization schemes may be used. For example, some embodiments apply a non-linear quantization, where large absolute values of residual are heavily quantized, while small values are preserved with maximum accuracy. Since very few pixels contain a residual having a large magnitude, most pixels are not affected by the strong quantization.

Strong quantization can result in some images having poor visual quality. This because even a few pixels that have large quantization errors can stand out in a way that detracts from perceived image quality.

A simple clamping of residual values (for example to an 8-bit range) can produce visually better results at the cost of losing details in very bright or dark regions. Furthermore, in typical images, with suitably chosen prediction functions, only a very few pixels have residual values that exceed an 8-bit range.

In some embodiments, to reduce clamping at the cost of a stronger quantization, residual values are divided by a constant quantization factor. The factor can be chosen based upon a trade-off between errors due to clamping and errors due to quantization. Such quantization factors can be set separately for each bin, based on the maximum magnitude of the residual for all pixels that belong to that bin. Therefore, the residual values after quantization can be computed as:

$$\hat{r}_l(i) = [r_l(i)/q(l)]^{-127+127}, \text{ where } l=k \Leftrightarrow i \subset \Omega_k$$

where:
the operator $[.]^{-127+127}$ rounds the value inside the square brackets to the closest integer and then clamps the value if it is larger than 127 or smaller than −127;
q(l) is a quantization factor that is selected separately for each bin $\Theta_k$. The quantization factor may be given by $$q(l) = \max\left(q_{min}, \frac{\max_{i \in \Omega_l}(|r_l(i)|)}{127}\right) \quad (19)$$

where $q_{min}$ is a minimum quantization factor which may be, for example, 1 or 2.

The quantization factors q(l) may be stored together with the prediction function in auxiliary data stream 84. This data may be first compressed as in block 95. In most cases, most of quantization factors q(l) will have the value $q_{min}$. Therefore, run-length encoding followed by Huffman encoding is an effective way to compress the data representing the quantization factors.

In block 102 the residual values are encoded. When the residual values are 8-bit values they can be encoded using ordinary MPEG compression (e.g. MPEG-4 compression). In a prototype embodiment, the quantized residual values, $\hat{r}_l$, and chroma residual values $r_u$ and $r_v$ are MPEG encoded after rounding them to the nearest integer value. Note that the operations applied to obtain residual values are approximately linear in cases where the prediction function is nearly linear and the effect of the adaptive quantization of Equation (18) is minimal. In such cases, the visual information of a residual frame is in the same frequency hands as the original HDR frame, and the DCT quantization of the residual has a similar effect as for the original HDR pixel values. Therefore, a standard DCT quantization matrix can be used for encoding the residual frames.

Since the MPEG encoding in blocks 88 and 102 are independent, it is possible to separately set MPEG quality parameters for each of blocks 88 and 102. In most applications, setting two sets of MPEG quality parameters is neither intuitive nor convenient. In preferred embodiments, a single quality control sets quality parameters for both of blocks 88 and 102. It has been found that setting the quality parameters in blocks 88 and 102 to be equal to one another provides generally satisfactory results.

Some quality settings for blocks 88 and 102 may give better compression results than others. To achieve the best quality HDR images, block 102 should comprise encoding using the best quality. The quality settings in block 88 primarily affect the quality of LDR images reconstructed from stream 80 but may have some impact on the quality of HDR images also.

Some embodiments of the invention exploit the fact that both LDR and HDR frames contain the same scenes. Therefore the optical flow should be the same for both of them. In such embodiments, the same motion vectors computed for LDR frames are also used for residual frames. Data structure 38 may include only one set of motion vectors. In alternative embodiments of the invention, motion vectors are computed separately for LDR and residual frames and both sets of motion vectors are stored in encoded image data 38.

Software for performing methods according to the invention may be implemented in various ways. In a prototype embodiment, the software is implemented as a dynamic library to simplify integration with external software. A separate set of command line tools permits for encoding and decoding of video streams from and to HDR image files.

Since HDR video playback involves decoding two MPEG streams, 80 and 82, achieving an acceptable frame rate is more challenging than in the case of ordinary LDR video playback. Playback frame rate can be boosted by performing some parts of the decoding process using graphics hardware. For example, both color space conversion and up-sampling of color channels can be computationally expensive when executed on a CPU and yet can be performed extremely efficiently in a graphics processor (GPU) as fragment programs. Additionally, some color conversion functions can be significantly accelerated with the use of fixed point arithmetic and lookup tables.

Figure 6:
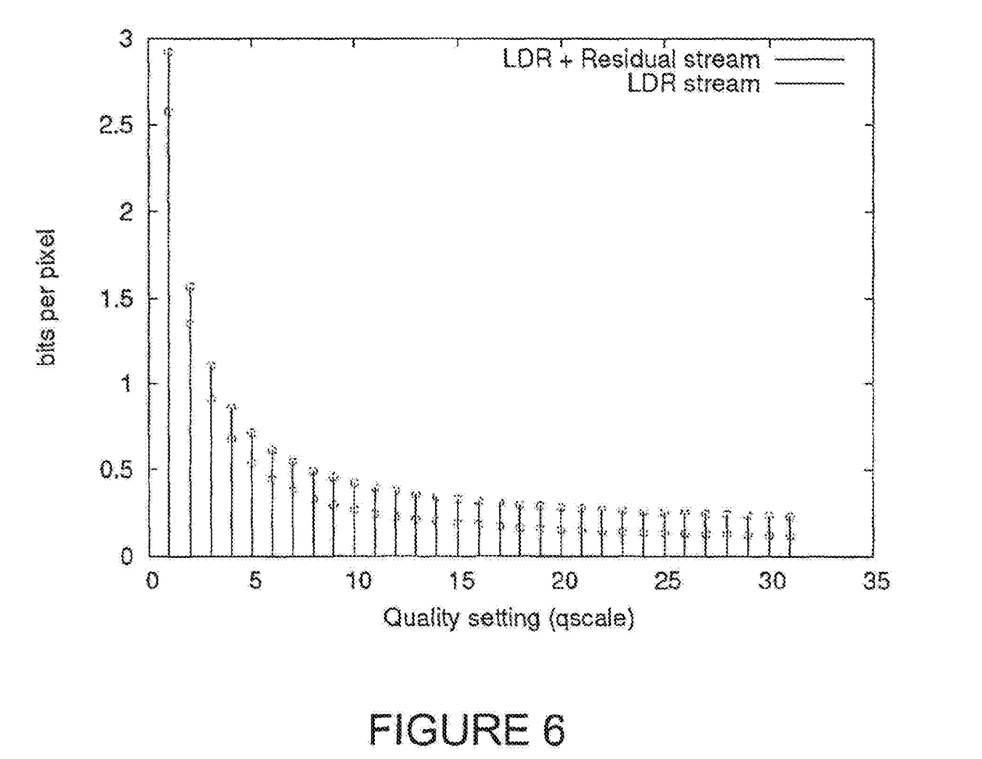

FIG. 6 illustrates the performance of the prototype embodiment as a function of the quality setting. The lower points correspond to LDR stream 80 whereas the upper points correspond to the sum of LDR stream 80 and residual stream 82. It can be seen that for lower values of the qscale quality parameter (i.e. for higher quality images) the percentage of the overall data stream made up by residual stream 82 is smaller than it is for higher values of the quality parameter (corresponding to lower-quality LDR images).

Codecs as described herein may be used to encode and decode both individual is and video sequences. Such codecs may be used to encode and decode movies to be stored on media such as DVDs, or other storage media that may become common for storing movies in future.

Some aspects of the invention provide media players that include an output for HDR images to which a HDR display device is connected or can be connected. The media players include hardware, software, or a combination of hardware and software that implement decoding methods as shown in FIG. 2 for example.

Certain implementations of the invention comprise computer processors which execute software instructions which cause the processors to perform a method of the invention. For example, one or more processors in a data processing system may implement the encoding methods of FIG. 1 or 3 or the decoding method of FIG. 2 by executing software instructions stored in a memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, any alterations and modifications are possible in the practice of this invention without departing from the spirit or scope thereof. Accordingly, the scope of the invention is to be construed in accordance with the substance defined by the following claims.

The invention claimed is:

1. A method for encoding an input high dynamic range (HDR) image represented in a first color space, the method comprising:
   accessing an input lower dynamic range (LDR) image represented in a second color space, the input LDR image corresponding to the input high dynamic range image, wherein the second color space is different than the first color space;
   generating a second HDR image; said generating the second HDR image comprising color transforming the input HDR image from the first color space to a third color space;
   generating a second LDR image; said generating the second LDR image comprising color transforming the input LDR image from the second color space to a fourth color space;
   generating a prediction function based on the second HDR image and the second LDR image;
   obtaining a predicted HDR image, said obtaining comprising applying the prediction function to the second LDR range image;
   generating a residual image representing differences between pixel values in the predicted HDR image and corresponding pixel values in the second HDR image; and
   encoding the second LDR image, the prediction function, and the residual image.

2. The method according to claim 1 further comprising:
   generating a quantized residual image, said generating the quantized residual image comprising quantizing the residual image with a quantization factor; and
   encoding the second LDR image, the prediction function, the quantized residual image, and the quantization factor.

3. The method of claim 1, wherein the generating the prediction function comprises binning pixels in the second high dynamic range image.

4. The method of claim 3, wherein the generating the prediction function further comprises analyzing the binned pixels by a technique comprising at least one of the following group: arithmetic average, median, average maximum and average minimum set as limiting values for the binned pixels, using a function that is nonlinear in the logarithmic domain, computing a centroid of a subset of the binned pixels.

5. The method of claim 1, further comprising generating a new prediction function for at least two frames in a video sequence, wherein the video sequence comprises the input LDR image and the input HDR image.

6. The method of claim 1, wherein encoding the prediction function comprises encoding a look up table.

7. The method of claim 1, wherein the third color space and the fourth color space are perceptually uniform color spaces.

8. The method of claim 1, wherein the second color space comprises an sRGB color space and the fourth color space comprises a lu'v' color space.

9. The method of claim 1, wherein the first color space comprises a XYZ color space.

10. The method of claim 1, further comprising generating the input LDR image by applying one of a tone-mapping function or a gamut mapping function to the input HDR image.

11. A method for decoding a datastream the method comprising:
 receiving an encoded image in a first dynamic range and a first color space, an encoded residual image in a second color space, and a prediction function;
 generating a first image in the first dynamic range and the first color space, said generating the first image comprises decoding the encoded image;
 generating a decoded residual image in the second color space, said generating the decoded residual comprises decoding the encoded residual image;
 applying the prediction function to the first image to obtain a second image in a second dynamic range and the second color space; and
 generating a third image, said generating the third image comprises combining the decoded residual image with the second image;
 wherein the prediction function is based on the first image in the first dynamic range and a reference image with a higher dynamic range than the first dynamic range to which the first image corresponds.

12. The method of claim 11, wherein applying the prediction function comprises mapping pixel values of the first image to pixel values of the second image using a look-up table.

13. The method of claim 11, further comprising:
 receiving a quantization factor; and
 dequantizing the decoded residual image with the quantization factor prior to the generating the third image.

14. The method of claim 11 wherein the second color space comprises a perceptually uniform color space.

* * * * *